(12) United States Patent
Cao Minh et al.

(10) Patent No.: US 10,931,513 B2
(45) Date of Patent: Feb. 23, 2021

(54) EVENT-TRIGGERED DISTRIBUTED DATA COLLECTION IN A DISTRIBUTED TRANSACTION MONITORING SYSTEM

(71) Applicant: Cisco Technology, Inc., San Jose, CA (US)

(72) Inventors: Chi Cao Minh, San Mateo, CA (US); Steven A. Bolton, San Rafael, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 16/263,813

(22) Filed: Jan. 31, 2019

(65) Prior Publication Data

US 2020/0252262 A1 Aug. 6, 2020

(51) Int. Cl.
*H04L 12/24* (2006.01)

(52) U.S. Cl.
CPC .................................. *H04L 41/065* (2013.01)

(58) Field of Classification Search
None
See application file for complete search history.

(56) References Cited

U.S. PATENT DOCUMENTS

| 6,714,976 B1 * | 3/2004 | Wilson | H04L 29/06 709/224 |
| 7,376,654 B1 * | 5/2008 | Chau | G06F 11/0709 |
| 7,383,332 B2 * | 6/2008 | Chong | H04L 67/16 709/223 |
| 8,234,631 B2 * | 7/2012 | Greifeneder | G06F 11/3495 717/128 |
| 8,429,467 B2 * | 4/2013 | Fallen | G06F 11/0778 714/57 |
| 9,338,255 B1 * | 5/2016 | Doe | H04L 67/22 |
| 9,451,017 B2 * | 9/2016 | Greifeneder | G06F 11/3466 |
| 9,596,253 B2 * | 3/2017 | Chauhan | H04L 63/0218 |
| 9,954,740 B2 * | 4/2018 | Degioanni | G06F 11/3495 |
| 9,983,887 B2 * | 5/2018 | Myrick | G06F 9/442 |
| 10,212,063 B2 * | 2/2019 | Nataraj | H04L 29/08072 |
| 10,635,568 B2 * | 4/2020 | Alvarez Marcos | G06F 11/3466 |
| 10,756,959 B1 * | 8/2020 | Makwarth | H04L 41/22 |
| 2004/0230763 A1 * | 11/2004 | Cohen | G06F 11/3466 711/170 |

(Continued)

*Primary Examiner* — Backhean Tiv
(74) *Attorney, Agent, or Firm* — Behmke Innovation Group; James J. Wong; James M. Behmke

(57) ABSTRACT

In one embodiment, a method for event-triggered distributed data collection in a distributed transaction monitoring system is disclosed. The method illustratively comprises receiving, by a device, application performance data of an instance of a distributed business transaction from a first agent, the application performance data including a unique identifier associated with the instance and limited to a time window; receiving, by the device, infrastructure performance data of the instance of the distributed business transaction from a second agent, the infrastructure performance data including the unique identifier associated with the instance; grouping, by the device, the application performance data and the infrastructure performance data based on the unique identifier; and identifying, by the device, a performance issue with the instance of the distributed business transaction through an analysis of the grouping of the application performance data and the infrastructure performance data.

20 Claims, 11 Drawing Sheets

(56) References Cited

U.S. PATENT DOCUMENTS

| | | | |
|---|---|---|---|
| 2005/0278703 A1* | 12/2005 | Lo | G06F 11/0751 717/126 |
| 2008/0109870 A1* | 5/2008 | Sherlock | G06F 21/552 726/1 |
| 2008/0235365 A1* | 9/2008 | Bansal | H04L 43/16 709/224 |
| 2009/0049429 A1* | 2/2009 | Greifeneder | G06F 11/3495 717/128 |
| 2010/0122175 A1* | 5/2010 | Gupta | H04L 41/0893 715/735 |
| 2010/0131668 A1* | 5/2010 | Kamath | H04L 47/32 709/233 |
| 2010/0131946 A1* | 5/2010 | Degaonkar | G06F 11/2028 718/1 |
| 2012/0278482 A1* | 11/2012 | Alon | H04L 47/10 709/224 |
| 2012/0304172 A1* | 11/2012 | Greifeneder | G06F 11/3419 718/1 |
| 2012/0317276 A1* | 12/2012 | Muniraju | H04L 43/0876 709/224 |
| 2013/0185643 A1* | 7/2013 | Greifeneder | H04L 67/22 715/736 |
| 2014/0052624 A1* | 2/2014 | Bansal | H04L 41/5038 705/39 |
| 2014/0136693 A1* | 5/2014 | Greifeneder | H04L 61/1505 709/224 |
| 2014/0279768 A1* | 9/2014 | Rash | H04L 63/1425 706/14 |
| 2015/0019715 A1* | 1/2015 | Ronen | H04L 43/0852 709/224 |
| 2015/0032884 A1* | 1/2015 | Greifeneder | H04L 43/04 709/224 |
| 2015/0081880 A1* | 3/2015 | Eaton | H04L 43/0817 709/224 |
| 2015/0378763 A1* | 12/2015 | Hassine | G06F 8/61 718/1 |
| 2016/0087859 A1* | 3/2016 | Kuan | H04L 41/065 715/736 |
| 2016/0224898 A1* | 8/2016 | Ryckbosch | G06N 20/00 |
| 2017/0324633 A1* | 11/2017 | Lehner | H04L 43/0876 |
| 2018/0123922 A1* | 5/2018 | Nataraj | H04L 41/0631 |
| 2019/0370146 A1* | 12/2019 | Babu | G06F 11/302 |
| 2020/0252262 A1* | 8/2020 | Cao Minh | H04L 41/046 |

\* cited by examiner

EVENT-TRIGGERED DISTRIBUTED DATA COLLECTION IN A DISTRIBUTED TRANSACTION MONITORING SYSTEM

TECHNICAL FIELD

The present disclosure relates generally to computer networks, and, more particularly, to event-triggered distributed data collection in a distributed transaction monitoring system.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together or trigger collection of disparate data that may be logged by different agents in a given network architecture. Moreover, even when data can be obtained, it is difficult to directly connect the chain of events and identify performance issue(s).

In one particular example, it can be difficult to determine the reason why a distributed application is experiencing an issue. For instance, diagnosing the root cause of a performance issue in a distributed application requires having all relevant data (e.g., application-related and infrastructure-related metadata and metrics) for a short time window before, during, and after an event associated with the performance issue occurs (e.g., application crash, a spike in memory usage, etc.). However, continuously capturing and retaining all of the relevant data, while waiting for the performance issue to occur, requires significant storage.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
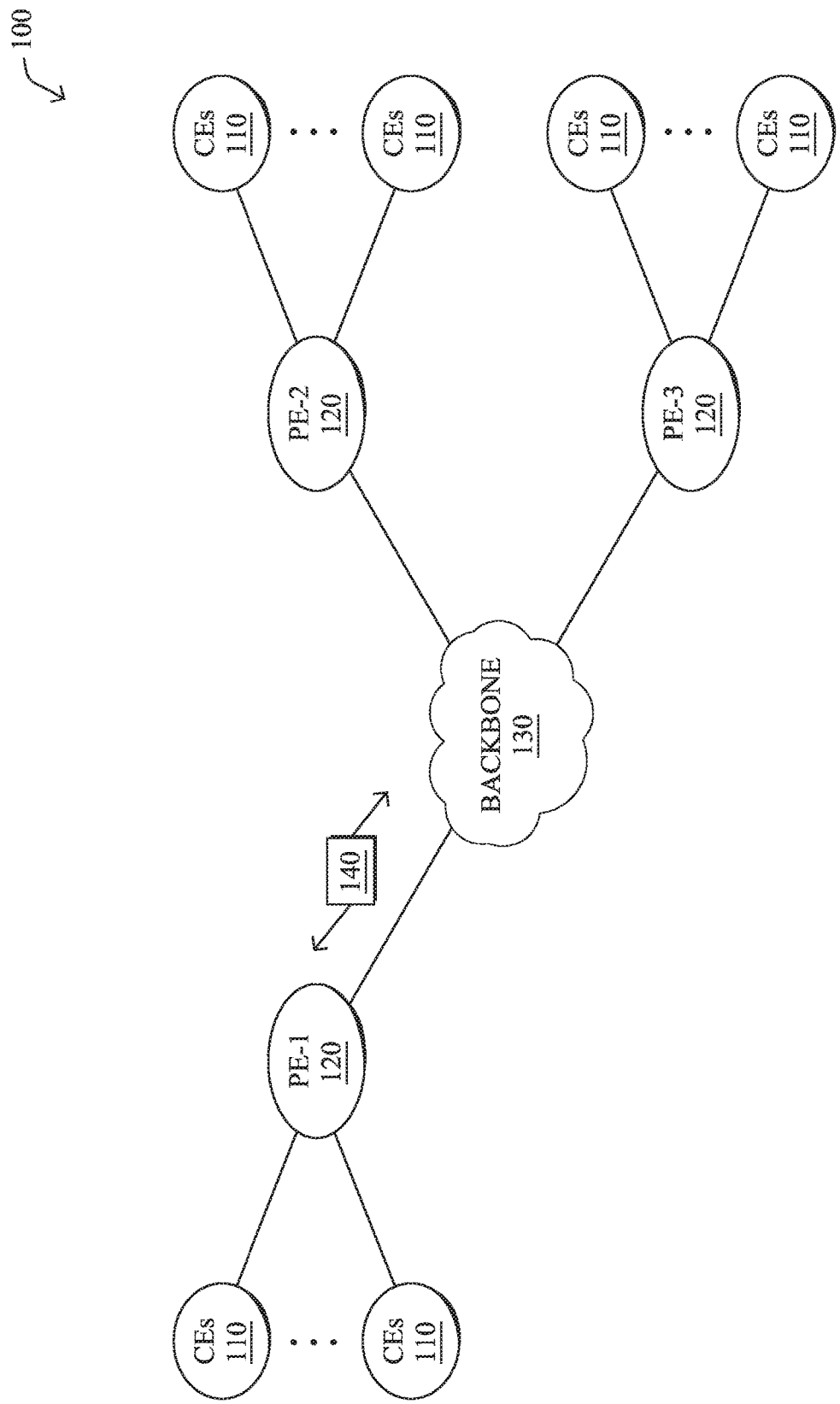
FIGS. 1A-1B illustrate an example computer network.

According to one or more embodiments of the disclosure, a method for event-triggered distributed data collection in a distributed transaction monitoring system is disclosed. The method illustratively comprises receiving, by a device, application performance data of an instance of a distributed business transaction from a first agent, the application performance data including a unique identifier associated with the instance and limited to a time window; receiving, by the device, infrastructure performance data of the instance of the distributed business transaction from a second agent, the infrastructure performance data including the unique identifier associated with the instance; grouping, by the device, the application performance data and the infrastructure performance data based on the unique identifier; and identifying, by the device, a performance issue with the instance of the distributed business transaction through an analysis of the grouping of the application performance data and the infrastructure performance data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
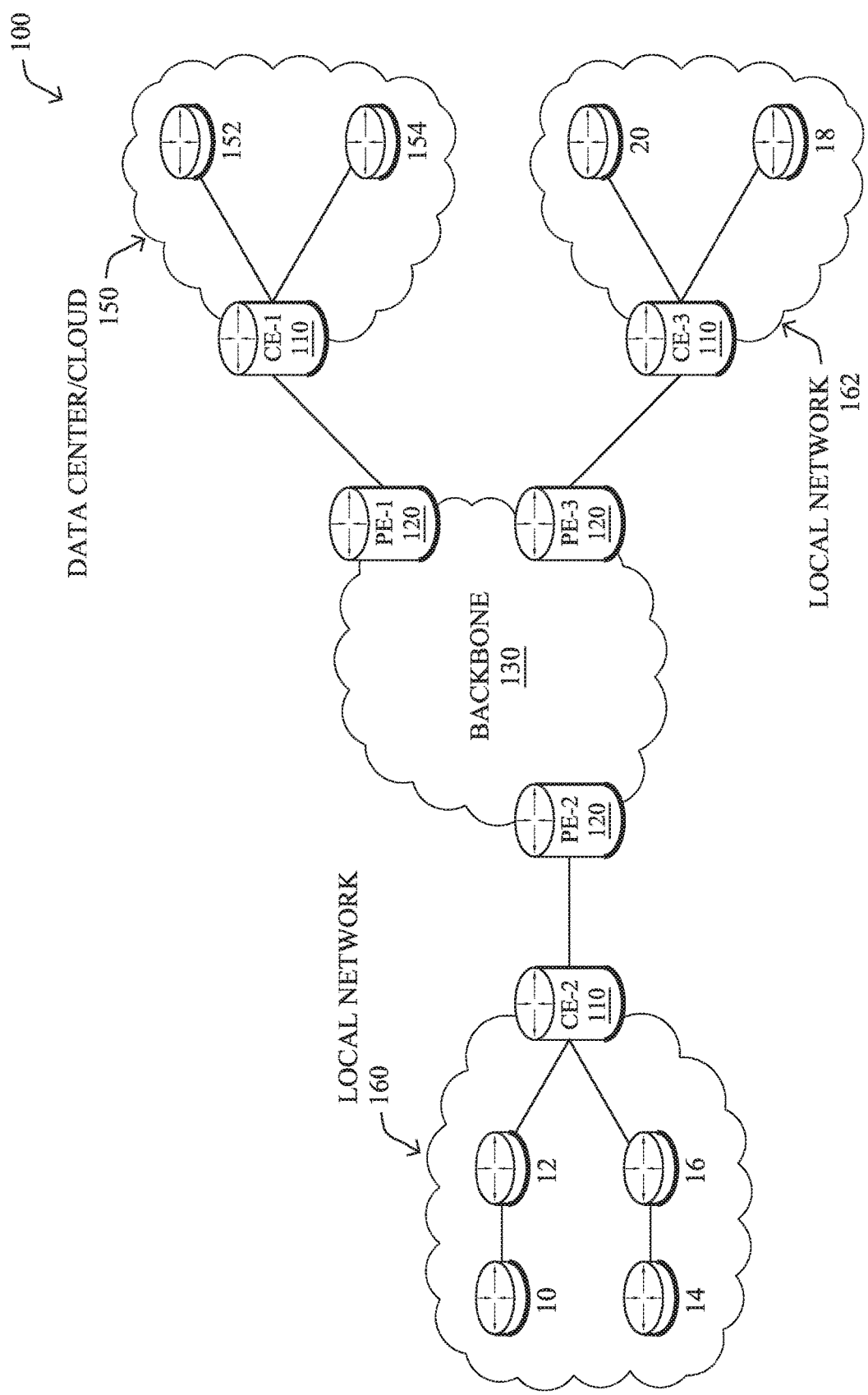

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
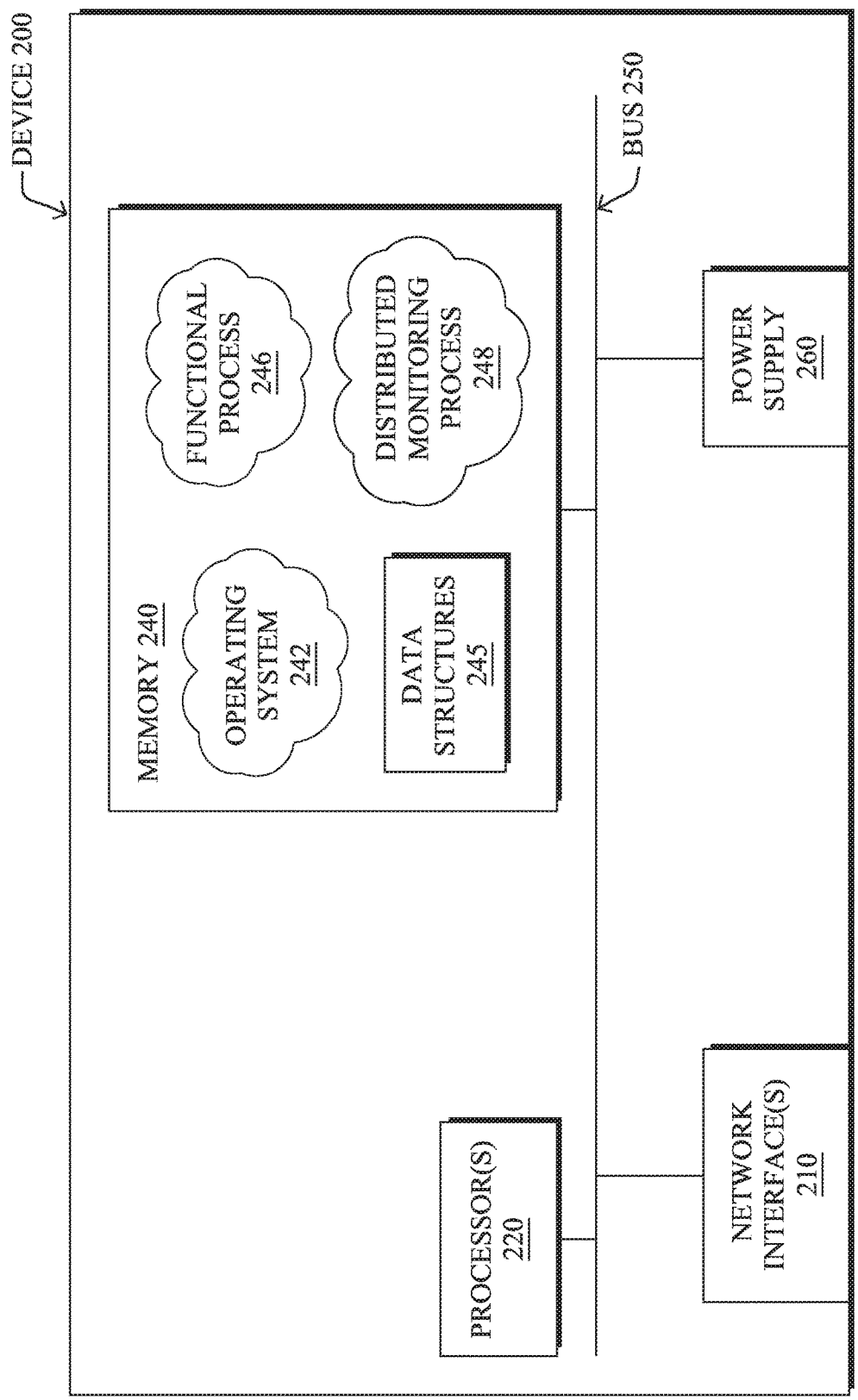
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "distributed monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
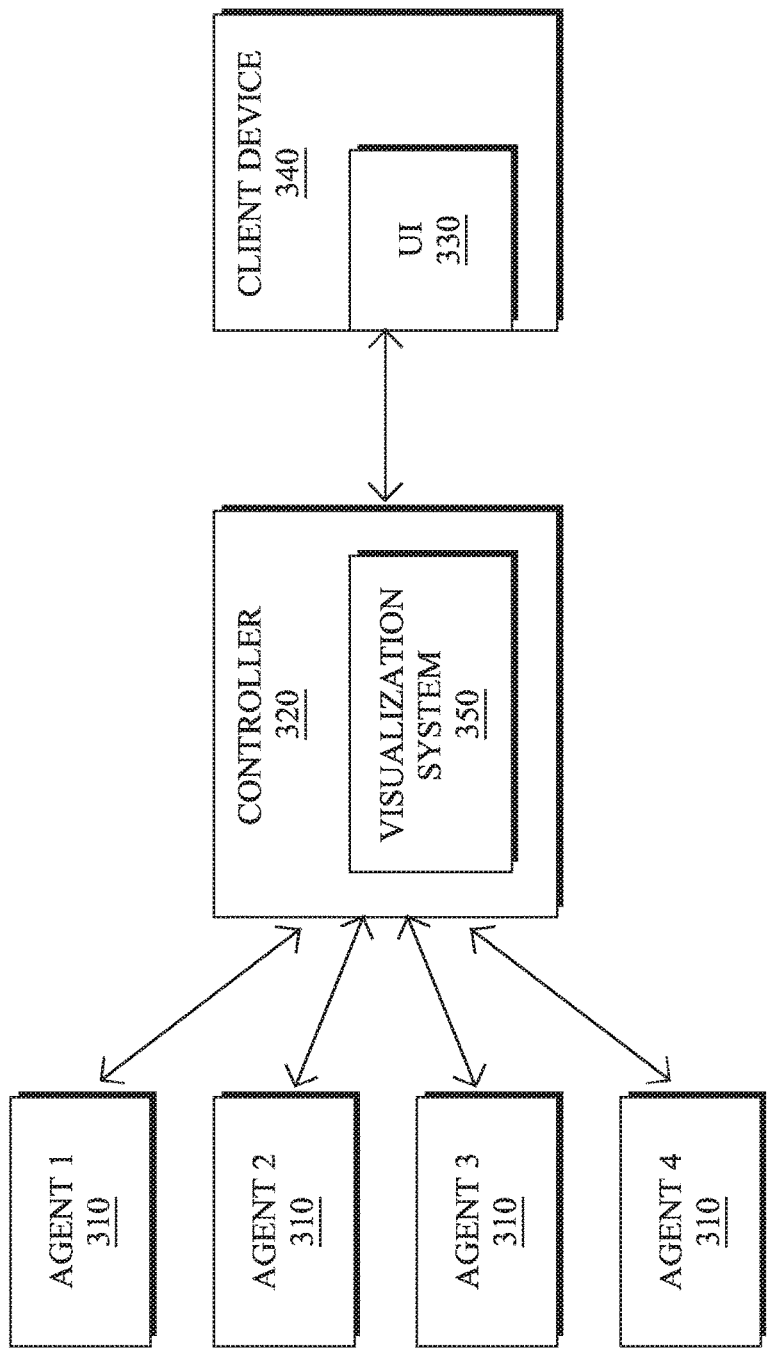
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
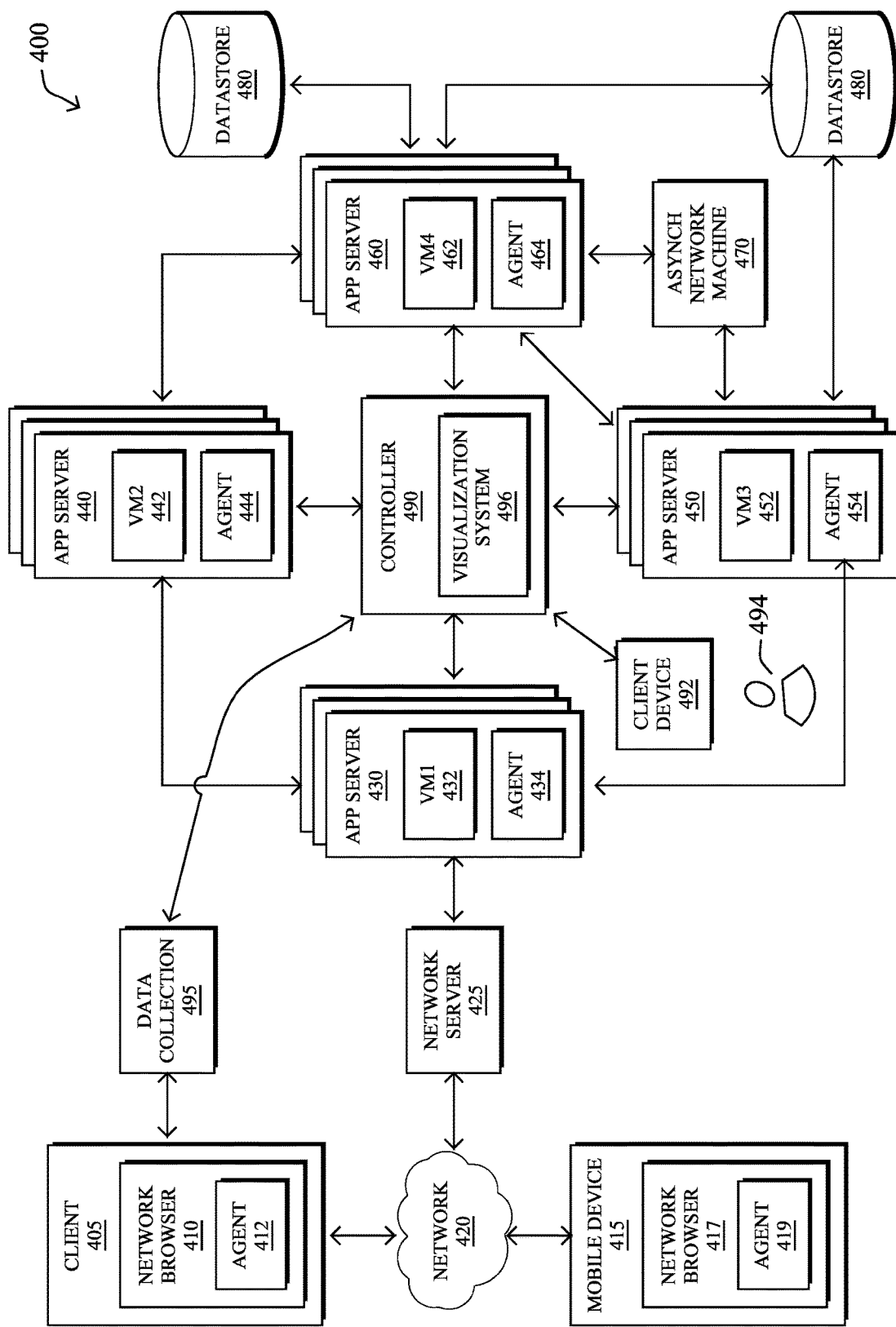
FIG. 4 illustrates an example system for distributed business transaction monitoring.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
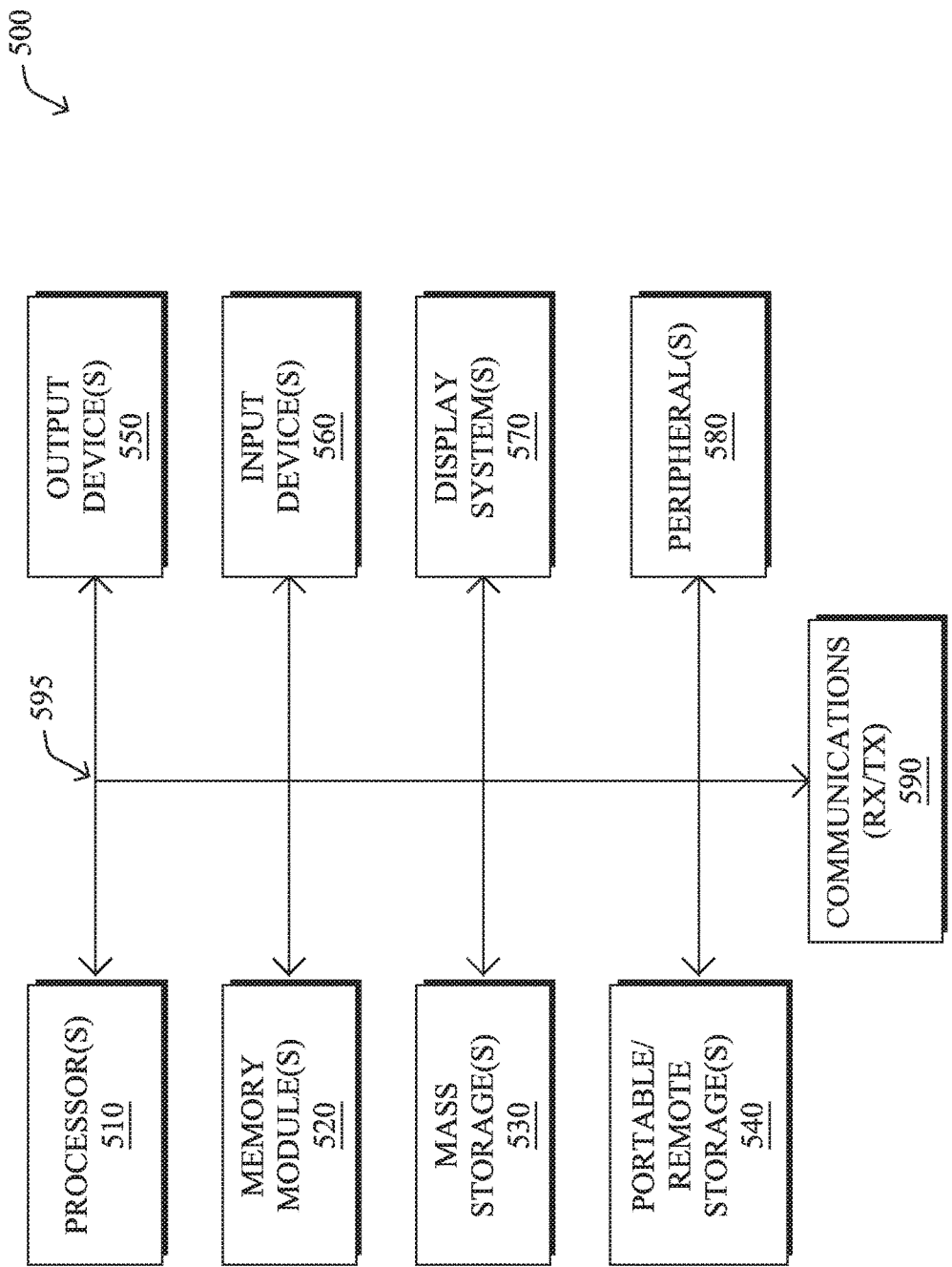
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5.

The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multiprocessor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Event-Triggered Distributed Data Collection in a Distributed Transaction Monitoring System—

As noted above, it can be difficult to determine the actual reason for a distributed application to be experiencing a performance issue, particularly whether an application agent associated with the distributed application, an infrastructure agent associated with the distributed application, or both that is causing the performance issue. Diagnosing the root cause of a performance issue in a distributed application requires having all relevant data (e.g., application-related and infrastructure-related metadata and metrics) for a short time window before, during, and after an event associated with the performance issue occurs (e.g., application crash, a spike in memory usage, etc.). However, continuously capturing and retaining all of the relevant data, while waiting for the performance issue to occur, requires significant storage. The use of the significant storage can be expensive monetarily as well as in terms of computer resources. Further, when capturing and retaining all of data related to the distributed application, most of the data may be unrelated to the relevant data required for analyzing the performance issue.

Conventional distributed transaction monitoring systems are able to capture snapshots of data based on an event associated with the performance issue occurs. These systems, however, are limited to capturing data of a single node of a distributed transaction application that can occur across a plurality of codes. In other words, diagnostic data captured by the single node is incomplete because it does not cover all the relevant nodes of the distributed application. Furthermore, the single node often is unable to capture data related to the infrastructure (e.g., computer hardware environment) that the distributed transaction may be occurring on. Conventional distributed transaction monitoring systems may be configured to continuously capture application-related and infrastructure-related data. However, as stated above, retaining all this data comes at a great storage cost.

The techniques herein, therefore, provide for event-triggered distributed data collection in a distributed transaction monitoring system that ensures only relevant data (both application-related and infrastructure-related) is captured and retained when a performance issue of a distributed application occurs. In particular, by triggering data collection only when performance issue events occur, the volume of required data storage can be greatly reduced. Here, the distributed transaction monitoring system recognizes that modern applications are distributed in nature (e.g., performed across a plurality of different servers). By coordinating diagnostic data collection across a distributed application, data collection is only triggered when performance issues actually occur.

Specifically, according to one or more embodiments of the disclosure as described in detail below, a method for event-triggered distributed data collection in a distributed transaction monitoring system illustratively comprises receiving, by a device, application performance data of an instance of a distributed business transaction from a first agent, the application performance data including a unique identifier associated with the instance and limited to a time window; receiving, by the device, infrastructure performance data of the instance of the distributed business transaction from a second agent, the infrastructure performance data including the unique identifier associated with the instance; grouping, by the device, the application performance data and the infrastructure performance data based on the unique identifier; and identifying, by the device, a performance issue with the instance of the distributed business transaction through an analysis of the grouping of the application performance data and the infrastructure performance data.

Illustratively, the techniques described herein may be performed by hardware, software, and/or firmware, such as in accordance with the illustrative distributed monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

Figure 6A:
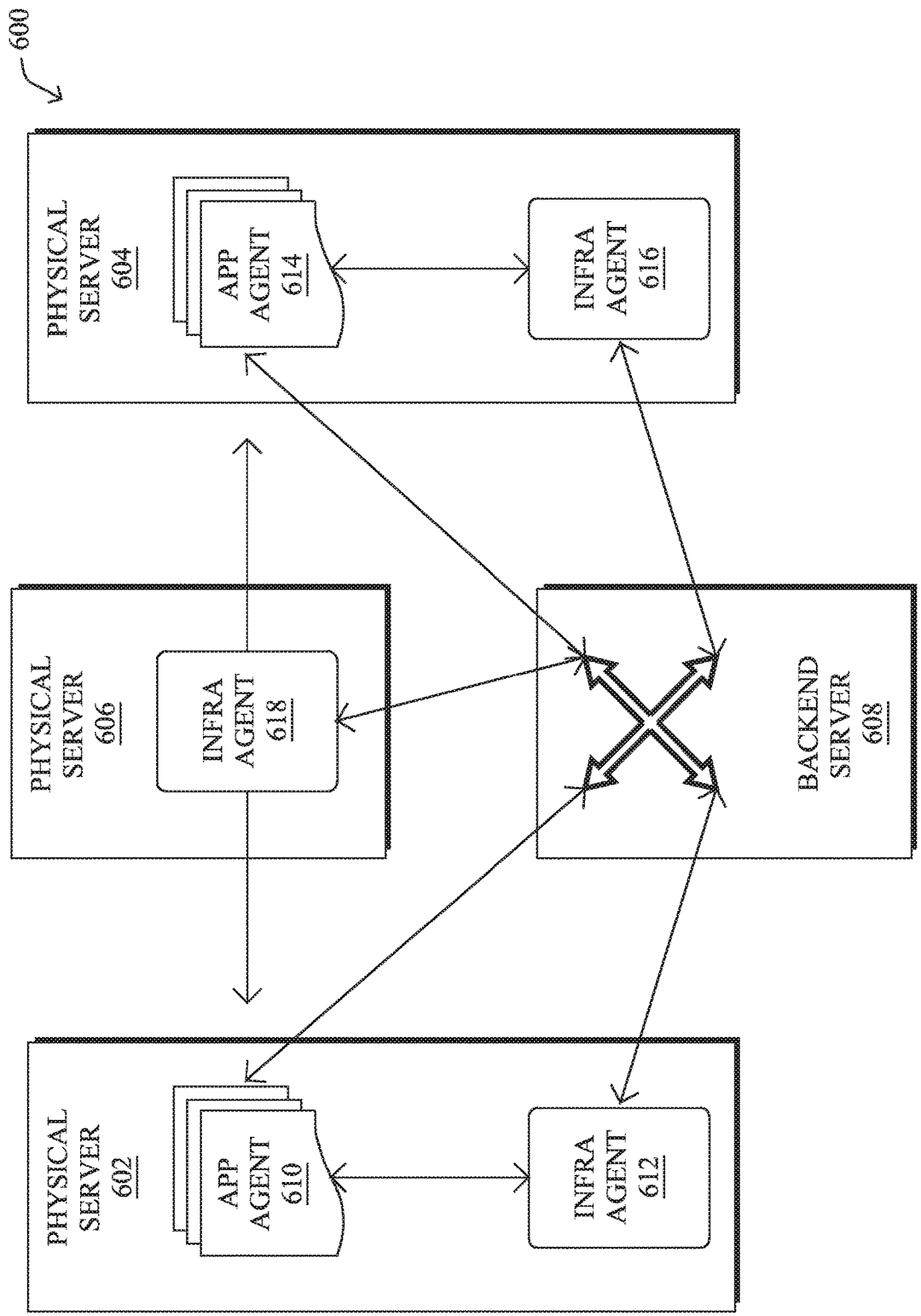
FIGS. 6A-6D illustrate an example distributed business transaction monitoring system.

Operationally, and as shown in FIGS. 6A-6D, the distributed transaction monitoring system may comprise application agents executing on physical servers, infrastructure agents on physical servers, and a backend server. With reference to FIG. 6A, the distributed transaction monitoring system 600 may comprise a first physical server 602, a second physical server 604, a third physical server 606, and a backend server 608. The first physical server 602 may be configured to execute a first plurality of application agents 610 associated with a distributed application (e.g., a business transaction) and a first infrastructure agent 612. The second physical server 604 may be configured to execute a second plurality of application agents 614 associated with a distributed application (e.g., a business transaction) and a second infrastructure agent 616. The third physical server 606 may be configured to execute a third infrastructure agent 618. The physical servers 602-606 and the backend server 608, as shown, may be in communication with each other and configured to transmit and/or receive information from one another. In particular, the application agents 610, 614 and the infrastructure agents 612, 616, 618 may each have a communication channel with the backend server 608. Communication among the agents may be facilitated by the backend server 608 (e.g., in a star topology network). Those skilled in the art will appreciate that other configurations of servers may be possible, and that the view shown herein is merely an example for illustration.

Each of the application agents 610, 614 may be configured to collect application data about the distributed transaction. Each of the infrastructure agents 612, 616, 618 may be configured to collect infrastructure data (e.g., containers, processes, disk usage, etc.) about a respective physical server that an infrastructure agent is running on. The infrastructure agents 612, 616, 618 may collect the infrastructure data about the physical server on which they are running as well as one or more remote physical servers (e.g., by remotely logging in via SSH to the one or more remote physical servers). Further, the infrastructure agents 612, 616, 618 can function as mini servers that facilitate communication on the (respective) physical servers 602, 604, 606 between application agents and an infrastructure agent, thereby avoiding a remote network hop to use the backend server 608 as a router back to the same physical server. The backend server 608 may receive the application data and the infrastructure data from any of the physical servers 602-606 and, as described in greater detail below, may perform analyses (e.g., correlation, machine learning, etc.) on the received data to identify or determine a performance issue related to the business transaction.

Data collection by the application agents 610, 614 and/or the infrastructure agents 612, 616, 618 is triggered when performance issue events related to the distributed business transaction. The events may be specified by an end user (e.g., that has entered predetermined values) or discovered automatically by an agent. In addition, as described above in relation to FIG. 4, the events may be based on the dynamic baselines and/or health rules described above. For example, an application agent can automatically create a distributed business transaction for application server endpoints or a user may configure a POJO method BT for a Java application. The application agent may automatically trigger data collection on: an application exception of the distributed business transaction, a deviation from an average execution time of the distributed business transaction, or an initiation of garbage collection by the distributed business transaction. For an infrastructure agent, the infrastructure agent may automatically trigger data collection on: an initiation of a container and/or database lifecycle operation, completion of the container and/or database lifecycle operation, a usage of memory at a predetermined level, or any of the metrics that can be collected by, for example, an application agent as described with respect to FIG. 3.

In response to being triggered when performance issue events related to the distributed business transaction occur, the application agents 610, 614 may perform reporting or retention of application data related to the performance issue. In particular, an application agent may send metrics (e.g., average response time) and metadata (e.g., call stack snapshots) about the distributed business transaction to the backend server 608. Typically, only recent metric and metadata history is stored locally in an application agent, whereas the backend server 608 may store a much longer history (e.g., due to hardware restraints of a physical server that the application agent is running on). The application agents 610, 614 may be configured to retain a local circular buffer of all application data collected (e.g., high-resolution time series of metrics and/or metadata). Generally, the time window captured by the circular buffer may be configurable, but it should be large enough to capture enough context to diagnose a performance issue (e.g., ten minutes before and five minutes after). At the same time, the time window should be small enough to not consume significant resources (e.g., memory consumption). The backend server 608 may store the metrics and/or metadata at lower resolutions to reduce storage costs.

Additionally, in response to being triggered when performance issue events related to the distributed business transaction occur, the infrastructure agents 612, 616, 618 may perform reporting or retention of infrastructure data (of a physical server which an infrastructure agent is running on) related to the performance issue. In particular, an infrastructure agent may be configured to collect infrastructure data (e.g., snapshots) that comprises a recent history of infrastructure metrics and metadata as described above with reference to FIG. 3 (e.g., lifecycle state of containers, recently changed system libraries and logs, memory usage of each process, etc.). Similar to the application agents, the infrastructure agents 612, 616, 618 may locally store the recent infrastructure and metadata history (e.g., in a local circular buffer), whereas the backend server 608 stores a much longer history.

When an application agent reports application data to the backend server 608, part of the application data contains a unique identifier. Notably, if the application agent is running directly on a physical server, the unique identifier may be a host identifier of the physical server. If the application agent is running in a container, the unique identifier may be a container identifier of the container. Similarly, the infrastructure data that an infrastructure agent sends to the backend server 608 can contain metadata with unique identifier(s) that correspond to those reported by the application agent. For example, the infrastructure metadata can contain the host identifier of the physical server as well as all the identifiers of any containers running on that physical server. Based on the unique identifiers present in the metadata (e.g., by matching the unique identifier(s)), the backend server 608 is able to associate application agents with infrastructure agents, and, thus, the application data with infrastructure data.

Figure 6B:
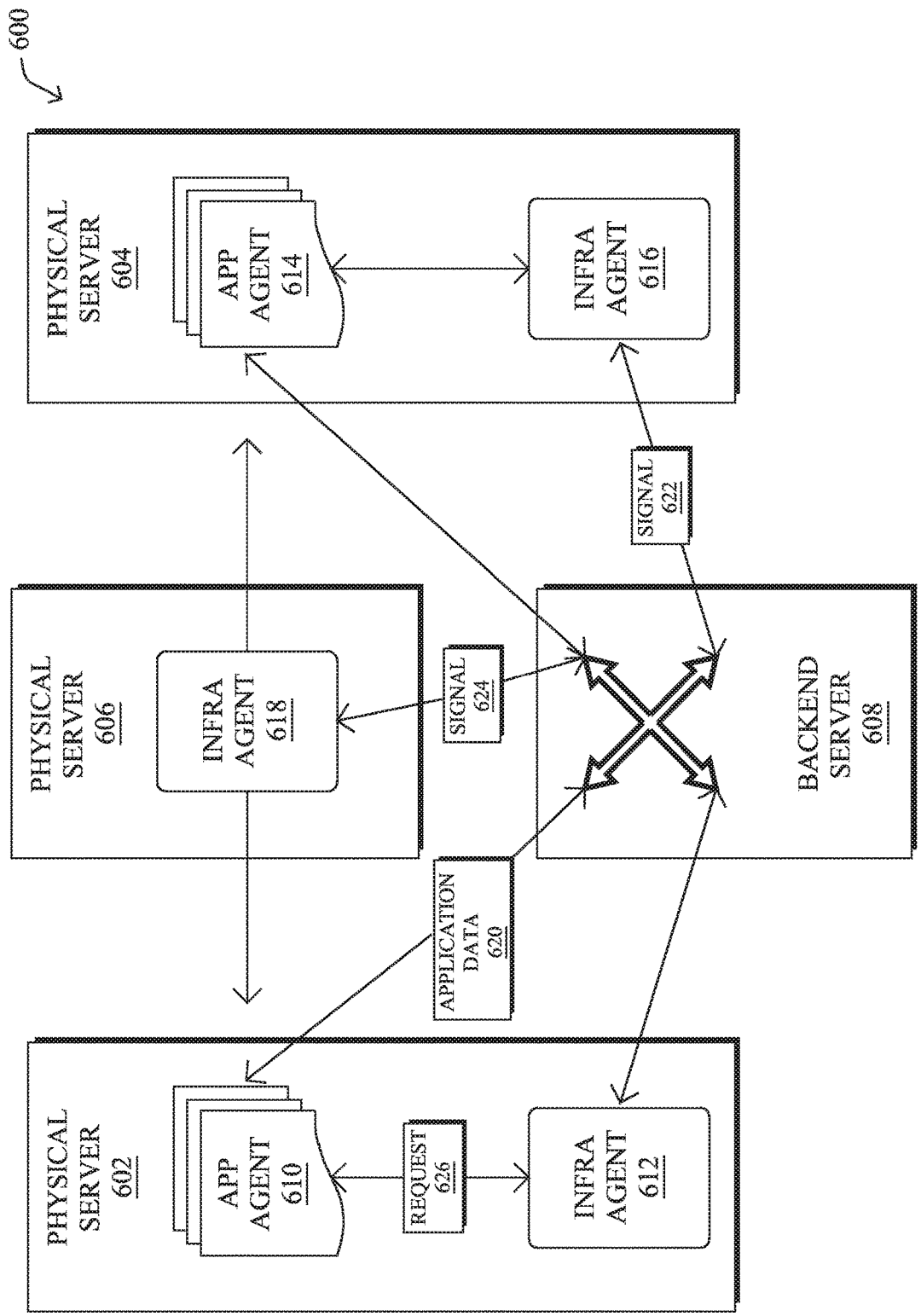

Turning to FIG. 6B, when the application agent 610 is triggered to send application data 620 (e.g., a snapshot bound by a time window) to the backend server 608, the backend end server 608 may be configured to request infrastructure agents associated with the application agent 610 to collect and send infrastructure data. In particular, when associated infrastructure agents 618, 616 are located on a different physical server, the application agent 610 can route snapshot capture signal messages 622, 624 to the associated infrastructure agents 618, 616 via the backend server 608. When an associated infrastructure agent 612 is on the same physical server 602 as the application agent 610, the application agent 610 may be configured to send a request 626 to a mini server built into the infrastructure agent 612 to avoid a remote network hop via the backend server 608.

Figure 6C:
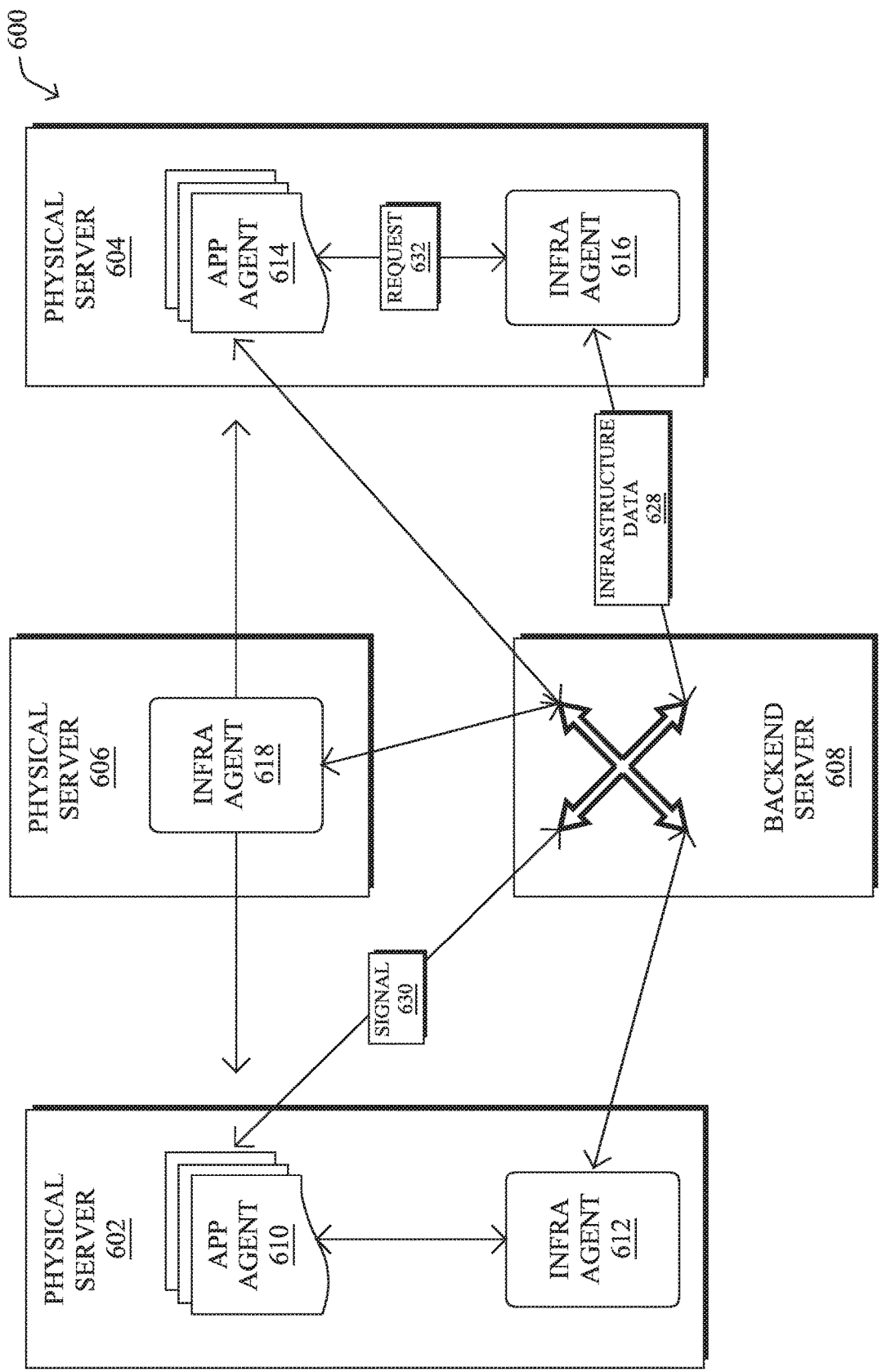

Similarly, and as shown in FIG. 6C, when the infrastructure agent 616 is triggered to send infrastructure data 628 (e.g., a snapshot bound by a time window) to the backend server 608, the backend end server 608 may be configured to request applications agents associated with the infrastructure agent 616 to collect and send application data. In particular, when an associated application agent 610 is located on a different physical server, the infrastructure agent 616 can route a snapshot capture signal messages 630 to the associated application agent 610 via the backend server 608. When an associated application agent 614 is on the same physical server 604 as the infrastructure agent 616, the infrastructure agent 616 may be configured to send a request 632 to a mini server built into the infrastructure agent 612 to avoid a remote network hop via the backend server 608.

Figure 6D:
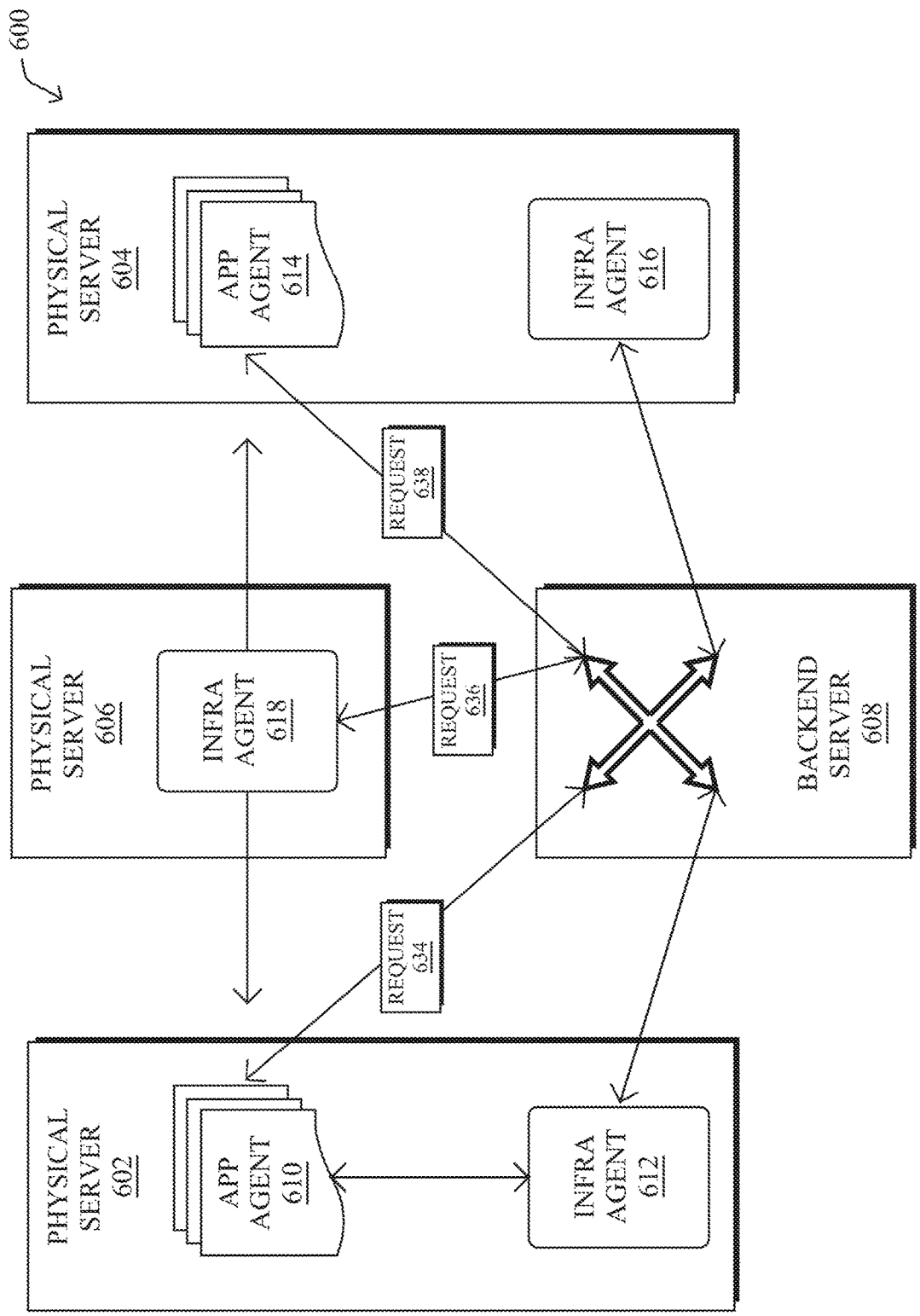

With reference to FIG. 6D, the backend server 608 may on its own detect a performance issue related to a tier of distributed business transaction, as described in greater detail above (e.g., when a monitored performance metric of the backend server 608 is above or below a user-specified threshold, automatically, etc.). The backend server 608, in this case, may be configured to send requests 634, 636, 638 to application agents and infrastructure agents to send, respectively, application data and infrastructure data related to the tier of the distributed business transaction. The backend server 608, after receiving associated application data and infrastructure data, may be configured to group the associated application and infrastructure snapshot data (e.g., based on the unique identifier) and then feed it to analysis algorithms (e.g., machine learning) to highlight a root cause, a match against previous similar occurrences, etc. of a performance issue that may be occurring on the distributed business transaction monitoring system 600.

According to one or more embodiments herein, various mitigation (remediation) actions may be taken in response to isolating particular network segments affecting application performance (e.g., identifying a performance issue of a distributed transaction caused by an application agent, infrastructure agent, or backend server), such as remediating against those issues (e.g., delay, packet loss, transaction misdirection, etc.) by reconfiguring the applications, the networks, or other attributes of the communication that could alleviate the issues with the application performance. Other actions, such as alarms, reports, displays (e.g., on a GUI), etc., may also be performed.

Figure 7:
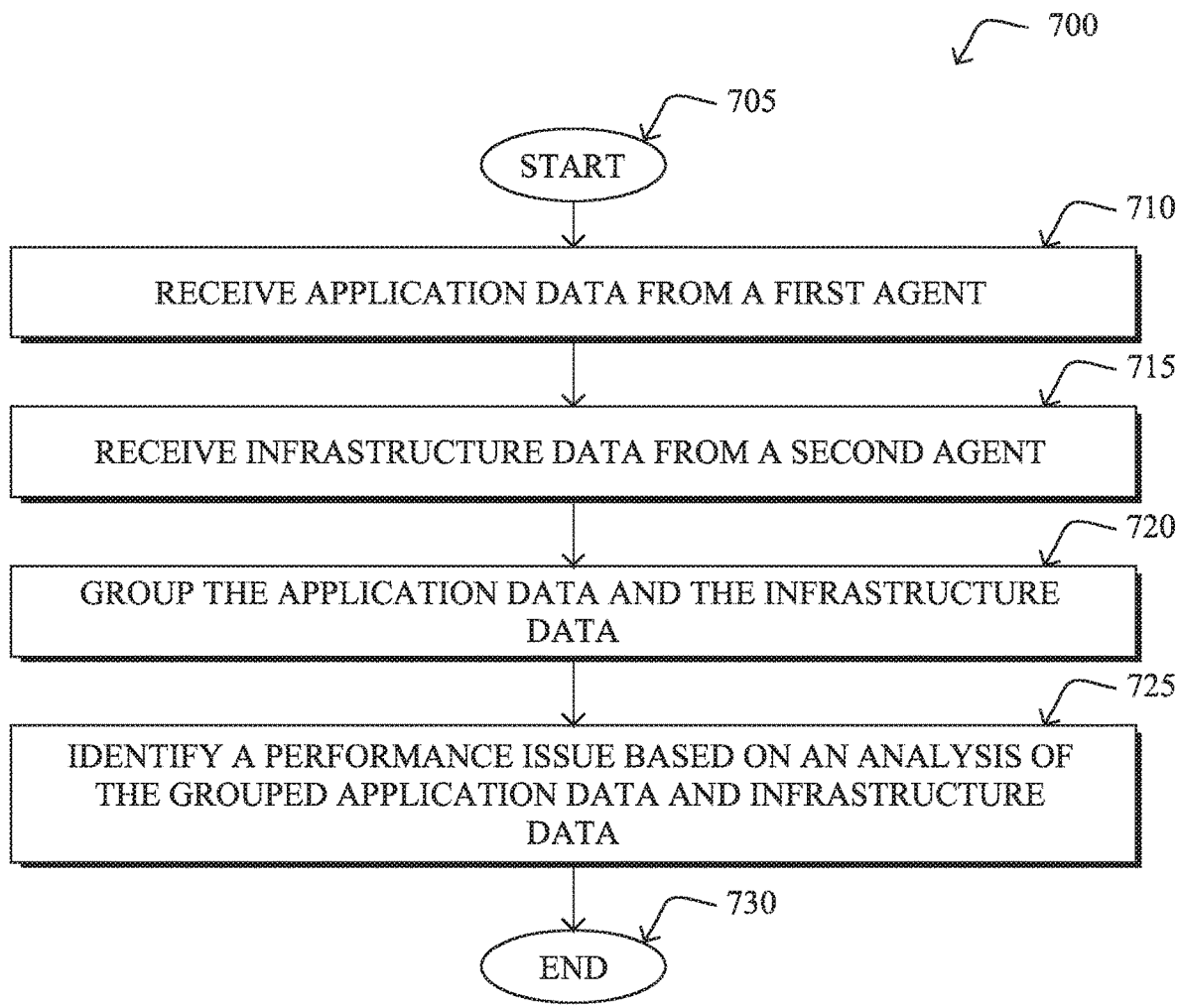
FIG. 7 illustrates an example procedure for event-triggered distributed data collection in a distributed transaction monitoring system in accordance with one or more embodiments described herein.

FIG. 7 illustrates an example procedure for event-triggered distributed data collection in a distributed transaction monitoring system in accordance with one or more embodiments described herein. For example, one or more non-generic, specifically configured devices may perform procedure 700 by executing stored instructions (e.g., distributed monitoring process 248). The procedure may start at step 705, and continues to step 710, where, as described in greater detail above, a device may receive application data from a first agent. The application performance data may comprise information regarding an instance of a distributed business transaction performed by the first agent (e.g. an application agent). The application performance data may include a unique identifier associated with the instance and limited to a time window. Further, the first agent can be triggered by, for example, an infrastructure agent or application agent to send the application performance data to the device. Additionally, the first agent may trigger a second agent to send infrastructure performance data to the device in response to the first agent performing an action selected from a group consisting of: an application exception of the distributed business transaction, a deviation from an average execution time of the distributed business transaction, or an initiation of garbage collection by the distributed business transaction In step 715, the device may receive infrastructure data from a second agent. The infrastructure performance data of the instance may be relevant information to instance of the distributed business transaction performed by the first agent (e.g. the application agent). The infrastructure performance data may include the unique identifier associated with the instance. Further, the second agent can be triggered by, for example, the application agent of step 710, a different application agent, or the backend server. Additionally, the second agent may trigger the first agent to send application data to the device in response to the second agent performing an action selected from a group consisting of: initiation of a container and/or database lifecycle operation, completion of the container and/or database lifecycle operation, or a usage of memory at a predetermined level In step 720, the device may group the application data and the performance data. The device may group the application data and the performance data using one or more unique identifiers (e.g., in the application data and the performance data). With more particularity, based on the unique identifiers present in the metadata (e.g., by matching the unique identifier(s)), the device may group the first agent with the second agent, and, thus, the application data with infrastructure data.

In step 725, the device may identify a performance issue based on an analysis of the grouped application and infrastructure data. In particular, after receiving associated application data and infrastructure data, the device may feed the grouped application data and infrastructure data to analysis algorithms (e.g., machine learning) to highlight a root cause, a match against previous similar occurrences, etc. of a performance issue that may be occurring on the distributed business transaction. Subsequent to identifying the performance issue, a remediation action may be taken for the performance issue.

The illustrative procedure 700 may then end in step 730.

It should be noted that certain steps within procedure 700 may be optional as described above, and the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an event-triggered distributed data collection in a distributed transaction monitoring system. In particular, by triggering data collection only when performance issue events occur, the volume of required data storage can be greatly reduced. Here, the distributed transaction monitoring system recognizes that modern applications are distributed in nature (e.g., performed across a plurality of different servers). By coordinating diagnostic data collection across a distributed application, data collection is only triggered when performance issues actually occur.

While there have been shown and described illustrative embodiments that provide for distributed transaction monitoring, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by a device, application performance data of an instance of a distributed business transaction from a first agent, the application performance data including a unique identifier associated with the instance and limited to a time window;
receiving, by the device, infrastructure performance data of the instance of the distributed business transaction from a second agent, the infrastructure performance data including the unique identifier associated with the instance;
grouping, by the device, the application performance data and the infrastructure performance data based on the unique identifier; and
identifying, by the device, a performance issue with the instance of the distributed business transaction through an analysis of the grouping of the application performance data and the infrastructure performance data.

2. The method of claim 1, wherein the first agent triggers the second agent to send the infrastructure performance data to the device.

3. The method of claim 2, wherein the first agent triggers the second agent to send the infrastructure performance data to the device in response to the first agent performing an event selected from a group consisting of: an application exception of the distributed business transaction, a deviation from an average execution time of the distributed business transaction, or an initiation of garbage collection by the distributed business transaction.

4. The method of claim 1, wherein the second agent triggers the first agent to send the application performance data to the device.

5. The method of claim 4, wherein the second agent triggers the first agent to send the application performance data to the device in response to the second agent performing an event selected from a group consisting of: an initiation of a container and/or database lifecycle operation, a completion of the container and/or database lifecycle operation, or a usage of memory at a predetermined level.

6. The method of claim 1, wherein the first agent is an application agent running on a physical server.

7. The method of claim 6, wherein the second agent is an infrastructure agent running on the physical server or a different physical server.

8. The method of claim 1, wherein the infrastructure performance data is limited to the time window.

9. The method of claim 1, wherein the application performance data is retained by the first agent in a local circular buffer that is limited to the time window and comprises metrics and/or metadata associated with the instance of the distributed business transaction.

10. The method of claim 1, wherein the application performance data is retained by the second agent in a local circular buffer that is collected automatically and/or based on user-specified configurations and comprises metrics and/or metadata associated with the instance of the distributed business transaction.

11. An apparatus, comprising:
one or more network interfaces to communicate with a network;
a processor coupled to the network interfaces and configured to execute one or more processes; and
a memory configured to store a process executable by the processor, the process when executed operable to:
receive application performance data of an instance of a distributed business transaction from a first agent, the application performance data including a unique identifier associated with the instance and limited to a time window;

receive infrastructure performance data of the instance of the distributed business transaction from a second agent, the infrastructure performance data including the unique identifier associated with the instance;

group the application performance data and the infrastructure performance data based on the unique identifier; and identify a performance issue with the instance of the distributed business transaction through an analysis of the grouping of the application performance data and the infrastructure performance data.

12. The apparatus of claim 11, wherein the first agent triggers the second agent to send the infrastructure performance data.

13. The apparatus of claim 12, wherein the first agent triggers the second agent to send the infrastructure performance data to the apparatus in response to the first agent performing an event selected from a group consisting of: an application exception of the distributed business transaction, a deviation from an average execution time of the distributed business transaction, or an initiation of garbage collection by the distributed business transaction.

14. The apparatus of claim 11, wherein the second agent triggers the first agent to send the application performance data.

15. The apparatus of claim 14, wherein the second agent triggers the first agent to send the application performance data to the apparatus in response to the second agent performing an event selected from a group consisting of: an initiation of a container and/or database lifecycle open ration, a completion of the container and/or database lifecycle operation, or a usage of memory at a predetermined level.

16. The apparatus of claim 11, wherein the first agent is an application agent running on a physical server.

17. The apparatus of claim 16, wherein the second agent is an infrastructure agent running on the physical server or a different physical server.

18. The apparatus of claim 11, wherein the application performance data is retained by the first agent in a local circular buffer that is limited to the time window and comprises metrics and/or metadata associated with the instance of the distributed business transaction.

19. The apparatus of claim 11, wherein the application performance data is retained by the second agent in a local circular buffer that is collected automatically and/or based on user-specified configurations and comprises metrics and/or metadata associated with the instance of the distributed business transaction.

20. A tangible, non-transitory, computer-readable medium storing program instructions that cause a device in a network to execute a process comprising:

receiving, by a device, application performance data of an instance of a distributed business transaction from a first agent, the application performance data including a unique identifier associated with the instance and limited to a time window;

receiving, by the device, infrastructure performance data of the instance of the distributed business transaction from a second agent, the infrastructure performance data including the unique identifier associated with the instance;

grouping, by the device, the application performance data and the infrastructure performance data based on the unique identifier; and identifying, by the device, a performance issue with the instance of the distributed business transaction through an analysis of the grouping of the application performance data and the infrastructure performance data.

* * * * *

UNITED STATES PATENT AND TRADEMARK OFFICE
CERTIFICATE OF CORRECTION

Page 1 of 1

PATENT NO. : 10,931,513 B2
APPLICATION NO. : 16/263813
DATED : February 23, 2021
INVENTOR(S) : Chi Cao Minh et al.

It is certified that error appears in the above-identified patent and that said Letters Patent is hereby corrected as shown below:

In the Specification

Column 11, Line 41, please amend as shown:
one or more separate machines. When network 420 is the In the Claims Column 23, Line 34, Claim 15: please amend as shown:
initiation of a container and/or database lifecycle Column 23, Line 35, Claim 15: please amend as shown:
operation, a completion of the container and/or database life- Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*